United States Patent
Akiyama (10) Patent No.: US 10,928,718 B2
(45) Date of Patent: Feb. 23, 2021

(54) PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/781,215

(22) Filed: Feb. 4, 2020

(65) Prior Publication Data
US 2020/0249555 A1 Aug. 6, 2020

(30) Foreign Application Priority Data
Feb. 5, 2019 (JP) .............................. JP2019-019036

(51) Int. Cl.
G03B 21/20 (2006.01)
H04N 9/31 (2006.01)
(52) U.S. Cl.
CPC ......... *G03B 21/204* (2013.01); *G03B 21/208* (2013.01); *H04N 9/3161* (2013.01); *H04N 9/3164* (2013.01)
(58) Field of Classification Search
CPC ...... G03B 21/00–64; H04N 9/31–3197; G02B 27/01–0189; G02B 26/008; G02B 6/0078
See application file for complete search history.

(56) References Cited

U.S. PATENT DOCUMENTS

| 5,161,042 A | 11/1992 | Hamada |
| 2002/0126390 A1 | 9/2002 | Matsushita et al. |

| 2005/0248736 A1 | 11/2005 | Itoh | |
|---|---|---|---|
| 2011/0043761 A1* | 2/2011 | Miyamae | G03B 21/204 353/20 |
| 2011/0043762 A1* | 2/2011 | Miyamae | G03B 21/204 353/20 |
| 2011/0234923 A1* | 9/2011 | Yamagishi | G03B 21/204 348/757 |

(Continued)

FOREIGN PATENT DOCUMENTS

| JP | H04-060538 A | 2/1992 |
| JP | 2002-214405 A | 7/2002 |

(Continued)

*Primary Examiner* — Christina A Riddle
*Assistant Examiner* — Christopher A Lamb, II
(74) *Attorney, Agent, or Firm* — Dority & Manning, P.A.

(57) ABSTRACT

A projector includes a laser light source apparatus, a fluorescence light source apparatus, a first integrator, a second integrator, a superimposing lens that laser light and fluorescence enter, a light modulator on which the laser light and the fluorescence having exited out of the superimposing lens are incident and which includes a plurality of pixels each formed of a plurality of sub-pixels, a microlens array including a plurality of microlenses provided in correspondence with the plurality of pixels, and a projection optical apparatus that projects light outputted from the light modulator. The first integrator includes a first multi-lens array including a plurality of first lenslets. The second integrator includes a second multi-lens array including a plurality of second lenslets. A lens division number of the first multi-lens array is greater than a lens division number of the second multi-lens array.

8 Claims, 8 Drawing Sheets

(56) References Cited

U.S. PATENT DOCUMENTS

| | | | |
|---|---|---|---|
| 2012/0008098 A1* | 1/2012 | Akiyama | F21S 41/153 |
| | | | 353/30 |
| 2012/0026469 A1* | 2/2012 | Akiyama | G03B 21/208 |
| | | | 353/20 |
| 2012/0051044 A1* | 3/2012 | Akiyama | G03B 21/2013 |
| | | | 362/233 |
| 2013/0027670 A1 | 1/2013 | Akiyama et al. | |
| 2014/0139810 A1* | 5/2014 | Matsubara | G03B 21/2013 |
| | | | 353/31 |
| 2014/0146291 A1* | 5/2014 | Kawamura | G03B 21/204 |
| | | | 353/31 |
| 2014/0168614 A1* | 6/2014 | Matsubara | G02B 27/141 |
| | | | 353/31 |
| 2014/0192331 A1* | 7/2014 | Toyooka | G03B 21/006 |
| | | | 353/85 |
| 2015/0029466 A1* | 1/2015 | Sakata | H01L 33/507 |
| | | | 353/31 |
| 2015/0103320 A1* | 4/2015 | Iijima | G03B 21/006 |
| | | | 353/31 |
| 2017/0242266 A1* | 8/2017 | Otani | G02B 27/30 |

FOREIGN PATENT DOCUMENTS

| | | |
|---|---|---|
| JP | 2005-321502 A | 11/2005 |
| JP | 2009-063892 A | 3/2009 |
| JP | 2010-078900 A | 4/2010 |
| JP | 2013-029585 A | 2/2013 |
| JP | 2013-054091 A | 3/2013 |
| JP | 2013-167812 A | 8/2013 |
| JP | 2015-060035 A | 3/2015 |

* cited by examiner

PROJECTOR

The present application is based on, and claims priority from JP Application Serial Number 2019-019036, filed Feb. 5, 2019, the disclosure of which is hereby incorporated by reference herein in its entirety.

BACKGROUND

1. Technical Field

The present disclosure relates to a projector.

2. Related Art

There is a projector of related art in which three dichroic mirrors disposed at different angles are used to separate white light from a light source into R light, G light, and B light and cause the separated R light, G light, and B light to be incident on a single light modulator to produce image light (see JP-A-04-60538, for example).

In the projector described above, however, the R light, the G light, and the B light separated by the dichroic mirrors have different optical path lengths, and areas illuminated with the R light, the G light, and the B light have different sizes accordingly, resulting in a problem of a decreases in light use efficiency.

SUMMARY

According to an aspect of the present disclosure, there is provided a projector including a laser light source apparatus that outputs laser light, a fluorescence light source apparatus that includes a phosphor and outputs fluorescence, a first integrator that the laser light enters, a second integrator that the fluorescence enters, a superimposing lens which is provided on a downstream of the first integrator and the second integrator and which the first laser light and the first fluorescence enter, a light modulator on which the first laser light and the first fluorescence having exited out of the superimposing lens are incident and which includes a plurality of pixels each formed of a plurality of sub-pixels, a microlens array including a plurality of microlenses provided in correspondence with the plurality of pixels, and a projection optical apparatus that projects light outputted from the light modulator. The first integrator includes a first multi-lens array including a plurality of first lenslets. The second integrator includes a second multi-lens array including a plurality of second lenslets. A lens division number of the first multi-lens array is greater than a lens division number of the second multi-lens array.

In the aspect described above, the first multi-lens array may include a first light-incident-side multi-lens array and a first light-exiting-side multi-lens array so disposed as to correspond to the first light-incident-side multi-lens array, and the second multi-lens array may include a second light-incident-side multi-lens array and a second light-exiting-side multi-lens array so disposed as to correspond to the second light-incident-side multi-lens array.

In the aspect described above, a shape of a spot of the first laser light formed on the first light-incident-side multi-lens array may have a lengthwise direction, and the lens division number of the first light-incident-side multi-lens array in the lengthwise direction may be greater than the lens division number of the first light-incident-side multi-lens array in a widthwise direction.

In the aspect described above, the projector may further include a polarization converter provided between a light exiting side of the second integrator and the superimposing lens.

In the aspect described above, the projector may further include a second laser light source apparatus that outputs second laser light, a second fluorescence light source apparatus that outputs second fluorescence, a third integrator that the second fluorescence enters, and a fourth integrator that the second laser light enters.

In the aspect described above, the first laser light, the second laser light, the first fluorescence, and the second fluorescence may be incident on the superimposing lens in different positions.

In the aspect described above, the plurality of sub-pixels may include a first sub-pixel, a second sub-pixel, a third sub-pixel, and a fourth sub-pixel, the first laser light may be incident on the first sub-pixels, the second laser light may be incident on the second sub-pixels, the first fluorescence may be incident on the third sub-pixels, and the second fluorescence may be incident on the fourth sub-pixels.

In the aspect described above, the first laser light may be red light, the second laser light may be blue light, the first fluorescence may be first green light, and the second fluorescence may be second green light.

DESCRIPTION OF EXEMPLARY EMBODIMENTS

Embodiments of the present disclosure will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

Embodiment

A projector according to the present embodiment is a projection-type image display apparatus that displays a color image on a screen. The projector according to the present embodiment uses a laser light source, such as a semiconductor laser that produces high-intensity, high-power light, as a light source of an illuminator.

Figure 1:
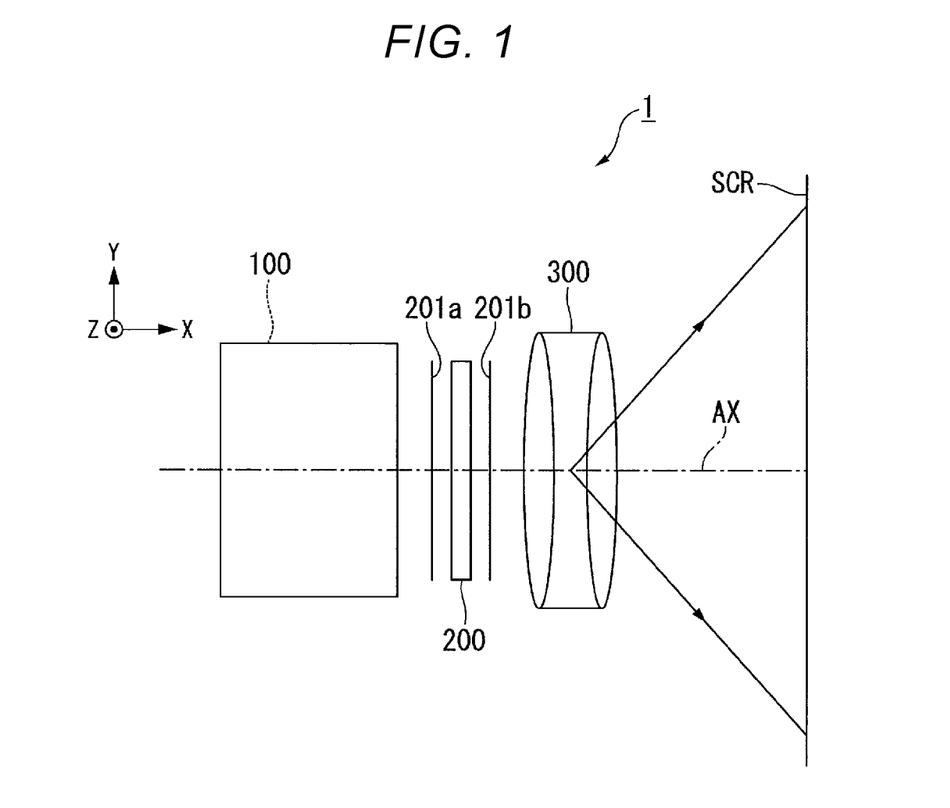
FIG. 1 is a plan view showing a schematic configuration of a projector according to an embodiment.

FIG. 1 is a plan view showing a schematic configuration of the projector according to the present embodiment.

A projector 1 includes an illuminator 100, a light modulator 200, and a projection optical apparatus 300, as shown in FIG. 1. In the projector 1, an illumination optical axis of illumination light outputted from the illuminator 100 is called an optical axis AX. The following description will be made by using an XYZ orthogonal coordinate system as required. The axis Z is an axis extending in the upward/downward direction of the projector, the axis X is an axis parallel to the optical axis AX, and the axis Y is an axis perpendicular to the axes X and Z.

The light modulator 200 is, for example, a single-plate liquid crystal light modulator using a single color liquid crystal display panel. Employing such a single-plate liquid crystal light modulator allows reduction in size of the projector 1. The light modulator 200 modulates the illumination light from the illuminator 100 in accordance with image information to form image light.

A light-incident-side polarizer 201a is provided on a side of the light modulator 200 that is the side facing the illuminator 100. A light-exiting-side polarizer 201b is provided on a side of the light modulator 200 that is the side facing the projection optical apparatus 300. The light-incident-side polarizer 201a and the light-exiting-side polarizer 201b have polarization axes perpendicular to each other.

The projection optical apparatus 300 is formed of a projection lens, enlarges the image light modulated by the light modulator 200, and projects the enlarged image light toward a screen SCR. The number of lenses that form the projection optical apparatus may be one or more.
Illuminator A specific configuration of the illuminator 100 will subsequently be described.

Figure 2:
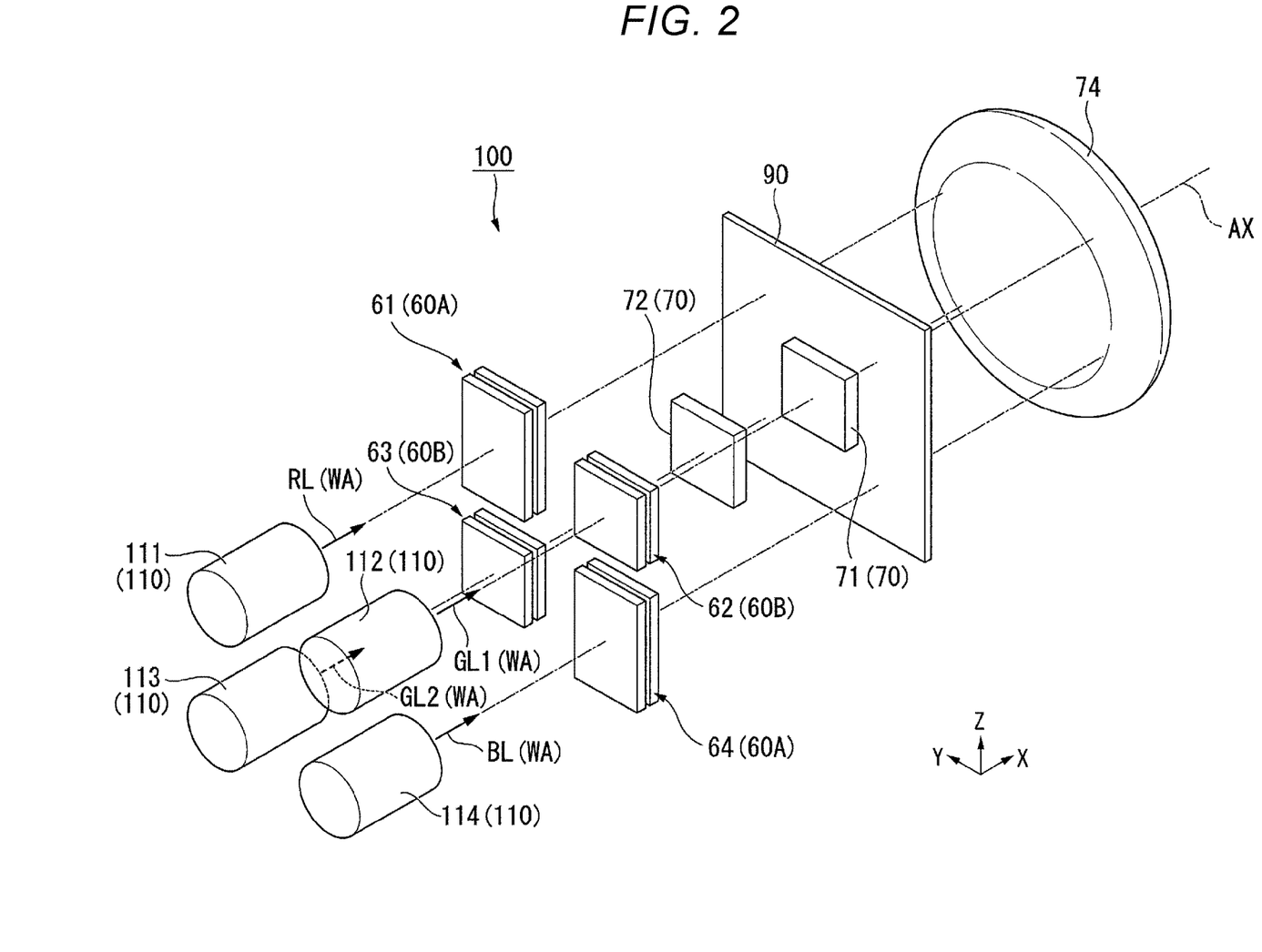
FIG. 2 is a perspective view showing a schematic configuration of an illuminator.

FIG. 2 is a perspective view showing a schematic configuration of the illuminator. The illuminator 100 includes a light source unit 110, an integrator 60A for laser light, an integrator 60B for fluorescence, a polarization conversion unit 70, a light blocker 90, and a superimposing lens 74, as shown in FIG. 2.

The light source unit 110 includes a first light source apparatus (first laser light source apparatus) 111, a second light source apparatus (first fluorescence light source apparatus) 112, a third light source apparatus (second fluorescence light source apparatus) 113, and a fourth light source apparatus (second laser light source apparatus) 114. The first light source apparatus 111 and the second light source apparatus 112 are disposed in the same position in the direction along the axis Z. The third light source apparatus 113 and the fourth light source apparatus 114 are disposed in the same position in the direction along the axis Z. The first light source apparatus 111 is located above (on +Z-side of) the third light source apparatus 113 in the direction along the axis Z. The second light source apparatus 112 is located above (on +Z-side of) the fourth light source apparatus 114 in the direction along the axis Z. That is, the light source unit 110 has a two-tier structure.

The integrator 60A for laser light includes a first integrator 61 and a fourth integrator 64. The integrator 60B for fluorescence includes a second integrator 62 and a third integrator 63.

Laser light outputted from the first light source apparatus 111 enters the first integrator 61. Laser light outputted from the fourth light source apparatus 114 enters the fourth integrator 64. Fluorescence outputted from the second light source apparatus 112 enters the second integrator 62. Fluorescence outputted from the third light source apparatus 113 enters the third integrator 63. The illuminator 100 in the present embodiment includes the integrators 61, 62, 63, and 64 individually corresponding to the light fluxes outputted from the light source apparatuses 111, 112, 113, and 114 of the light source unit 110.

The polarization conversion unit 70 includes a first polarization converter 71 and a second polarization converter 72. The first polarization converter 71 is disposed on the downstream of the second integrator 62, and the second polarization converter 72 is disposed on the downstream of the third integrator 63. The first polarization converter 71 converts the light outputted from the second light source apparatus 112 into linearly polarized light, and the second polarization converter 72 converts the light outputted from the third light source apparatus 113 into linearly polarized light.

The light blocker 90 blocks part of the light having exited out of the polarization conversion unit 70 to shape the shape of the light to be incident on the superimposing lens 74. The superimposing lens 74 is formed, for example, of a convex lens, superimposes the light fluxes having passed through the light blocker 90 on one another, and causes the resultant light to be incident on the light modulator 200.

Figure 3:
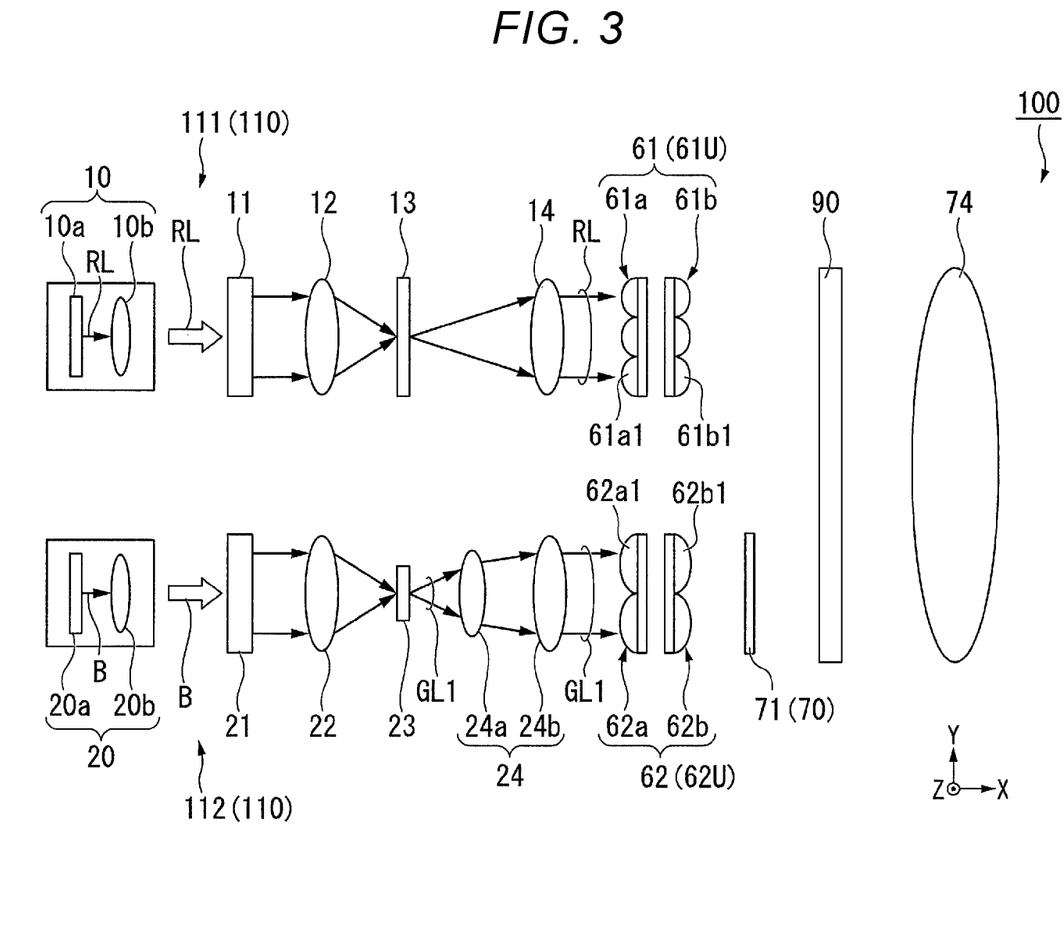
FIG. 3 shows the configuration of an upper tier of the illuminator.
Figure 4:
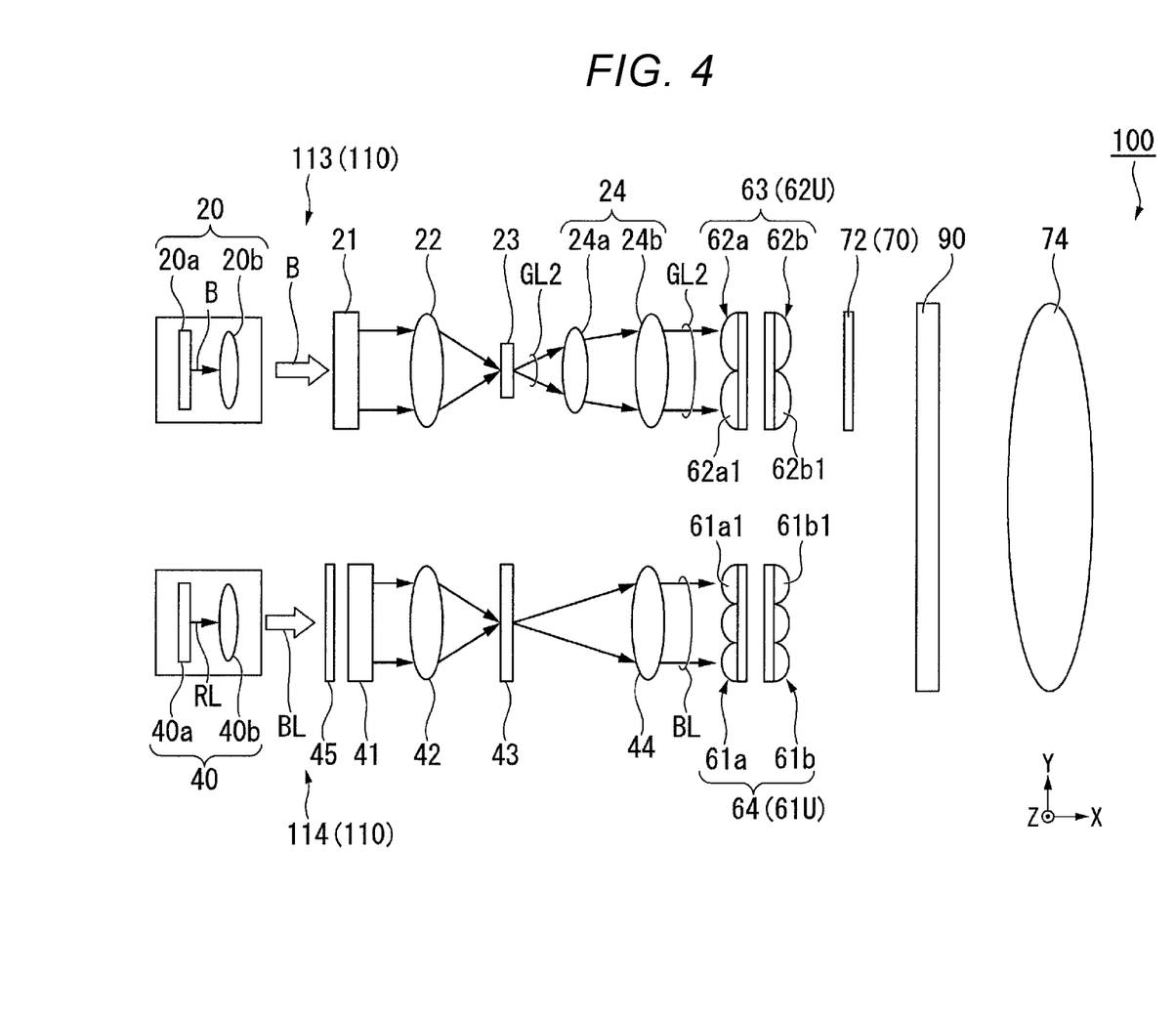
FIG. 4 shows the configuration of a lower tier of the illuminator.

FIG. 3 shows the configuration of the upper tier of the illuminator. FIG. 4 shows the configuration of the lower tier of the illuminator.

The first light source apparatus 111 includes a laser light source 10, a homogenizer 11, a light collection lens 12, a diffuser plate 13, and a pickup lens 14, as shown in FIG. 3.

The laser light source 10 includes a red semiconductor laser device 10a, which outputs red light (first laser light) RL as laser light, for example, having a peak wavelength of 635 nm±20 nm, and a collimation lens 10b, which parallelizes the outputted red light RL.

Figure 5:
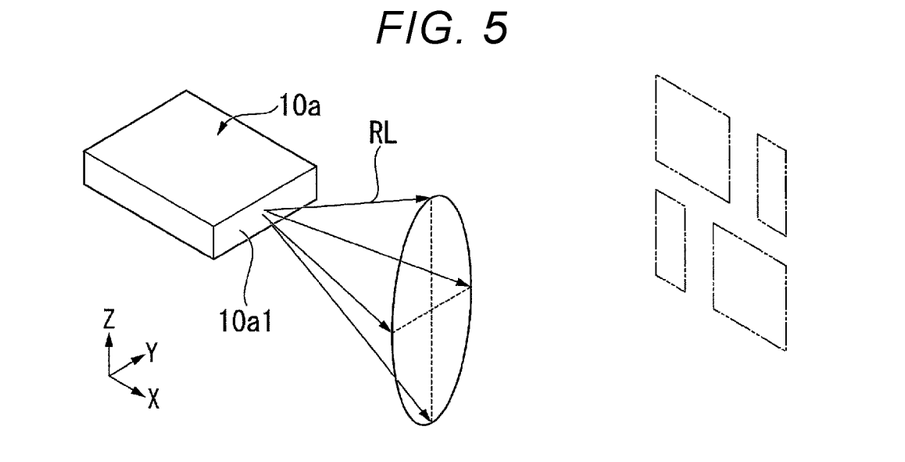
FIG. 5 shows the configuration of a key portion of a red semiconductor laser.

FIG. 5 shows the configuration of a key portion of a red semiconductor laser. The red semiconductor laser device 10a has a light exiting surface 10a1, as shown in FIG. 5. The light exiting surface 10a1 has a substantially oblong planar shape having long edges extending along the direction Y and short edges extending along the direction Z when viewed in the direction along the chief ray of the red light RL outputted from the red semiconductor laser device 10a.

The red light RL outputted from the red semiconductor laser device 10a is linearly polarized light having a polarization direction parallel to the widthwise direction of the light exiting surface 10a1 and passing through the light-incident-side polarizer 201a provided on the light incident side of the light modulator 200 shown in FIG. 1 (light polarized in parallel to Z axis, for example).

Before the red light RL enters the collimation lens 10b, the angle of divergence of the red light RL in the widthwise direction of the light exiting surface 10a1 is greater than the angle of divergence of the red light RL in the lengthwise direction of the light exiting surface 10a1. That is, a cross section of the red light RL before entering collimation lens 10b that is a cross section parallel to a plane perpendicular to the optical axis of the red light RL has an elliptical shape having a major axis extending in the direction Z.

Based on the configuration described above, the laser light source 10 outputs the red light RL formed of a parallelized light ray flux toward the homogenizer 11. A cross section of the parallelized red light RL that is a cross section parallel to a plane perpendicular to the chief ray of the red light RL has an elliptical cross-sectional shape DS having a major axis extending along the direction Z and a minor axis extending along the direction Y, as shown in FIG. 5.

Referring back to FIG. 3, the homogenizer 11 homogenizes to homogenize the intensity distribution of the red light RL. The homogenizer 11 is formed, for example, of a pair of multi-lens arrays. The light collection lens 12 collects the red light RL having passed through the homogenizer 11 and causes the collected red light RL to be incident on the diffuser plate 13. The diffuser plate 13 diffuses the red light RL to further homogenize the intensity distribution thereof. The diffuser plate 13 can be a known a known diffuser plate, for example, a ground glass plate, a holographic diffuser, a transparent substrate having a blasted surface, or a transparent substrate having scatterers, such as beads, dispersed therein to allow the scatterers to scatter light.

The pickup lens 14 parallelizes the red light RL diffused by the diffuser plate 13. The pickup lens 14 is formed of a single lens. The pickup lens 14 may instead be formed of a plurality of lenses.

As described above, the first light source apparatus 111 is configured to output the red light RL formed of laser light toward the first lens integrator 61 of the integrator 60A for laser light.

The second light source apparatus 112 includes an excitation light source 20, a homogenizer 21, a light collection lens 22, a phosphor layer 23, and a pickup system 24. The excitation light source 20 excites the phosphor layer 23 to produce fluorescence. The excitation light source 20 includes a laser light emitting device 20a, which outputs blue laser light that belongs, for example, to a wavelength band ranging from 440 to 470 nm as excitation light B, and a collimation lens 20b, which parallelizes the excitation light B outputted from the laser light emitting device 20a. The excitation light source 20 may instead be formed of a plurality of blue laser light emitting devices in accordance with the required power of the excitation light B.

The homogenizer 21 homogenizes the illuminance distribution of the excitation light B. The homogenizer 21 is formed, for example, of a pair of multi-lens arrays. The light collection lens 22 collects the excitation light B having passed through the homogenizer 21 and causes the collected excitation light B to be incident on the phosphor layer 23.

The phosphor layer 23 contains a phosphor that absorbs the excitation light B and is excited thereby. The phosphor excited by the excitation light B emits first green light (first fluorescence) GL1, for example, having a peak wavelength of 550 nm±30 nm. The phosphor layer 23 outputs the first green light GL1 via a side of the phosphor layer 23 that is the side opposite the side on which the excitation light B is incident. The first green light GL1 emitted from the phosphor layer 23 enters the pickup system 24. The first green light GL1 is radiated at a larger angle than the angle at which the red light RL formed of laser light is radiated. The pickup system 24, which includes two convex lenses 24a and 24b, can satisfactorily pick up and parallelize the first green light GL1 radiated at a large angle.

The second light source apparatus 112 thus outputs the first green light GL1, which is formed of fluorescence, toward the second integrator 62 of the integrator 60B for fluorescence. Since the first green light GL1 is radially emitted from the phosphor layer 23, a cross section of the parallelized first green light GL1 that is a cross section parallel to a plane perpendicular to the chief ray thereof has a substantially circular shape.

It is conceivable that green light is produced in the form of laser light, but a green laser light emitting device has poor light emission efficiency and is also expensive. In contrast, the second light source apparatus 112 in the present embodiment produces the first green light GL1 by using fluorescence, whereby bright green light can be produced at low cost.

The third light source apparatus 113 has the same configuration as that of the second light source apparatus 112, as shown in FIG. 4. That is, the third light source apparatus 113 includes the excitation light source 20, the homogenizer 21, the light collection lens 22, the phosphor layer 23, and the pickup system 24 and outputs green light (second fluorescence) GL2, which is formed of fluorescence, toward the third integrator 63 of the integrator 60B for fluorescence.

The fourth light source apparatus 114 includes a laser light source 40, a retardation film 45, a homogenizer 41, a light collection lens 42, a diffuser plate 43, and a pickup lens 44. The laser light source 40 includes a blue semiconductor laser device 40a, which outputs blue light (second laser light) BL as laser light, for example, having a peak wavelength of 455 nm±20 nm, and a collimation lens 40b, which parallelizes the blue light BL outputted from the blue semiconductor laser device 40a.

The blue semiconductor laser device 40a has a substantially oblong light exiting surface, as does the red semiconductor laser device 10a. In the present embodiment, the first light source apparatus 111 and the fourth light source apparatus 114 are so disposed that the red semiconductor laser device 10a in the laser light source 10 and the blue semiconductor laser device 40a in the laser light source 40 have the same orientation, that is, the long edges of the rectangular light exiting surfaces face in the same direction. A cross section of the blue light BL outputted from the laser light source 40 that is a cross section parallel to a plane perpendicular to the chief ray thereof therefore has an elliptical shape having a major axis extending along the direction Z and a minor axis extending along the direction Y, as shown in FIG. 5.

The red semiconductor laser device 10a and the blue semiconductor laser device 40a, however, output linearly polarized light fluxes polarized in different directions due to the difference in oscillation mode. Specifically, the blue light BL outputted from the blue semiconductor laser device 40a is linearly polarized light having a polarization direction parallel to the lengthwise direction of a light exiting surface 40a1 and is therefore polarized in parallel to the axis Y and unable to pass through the light-incident-side polarizer 201a provided on the light incident side of the light modulator 200 unless the polarization direction is changed.

In view of the fact described above, the fourth light source apparatus 114 includes the retardation film 45 disposed between the laser light source 40 and the homogenizer 41. The retardation film 45 is a half-wave plate. The blue light BL incident on the retardation film 45 is converted from the light polarized in parallel to the axis Y into light polarized in parallel to the axis Z. The blue light BL is thus so converted as to be allowed to pass through the light-incident-side polarizer 201a provided on the light incident side of the light modulator 200.

The homogenizer 41 homogenizes the illuminance distribution of the blue light BL. The homogenizer 41 is formed, for example, of a pair of multi-lens arrays. The light collection lens 42 collects the blue light BL having passed through the homogenizer 41 and causes the collected blue light BL to be incident on the diffuser plate 43. The diffuser plate 43 diffuses the blue light BL to further homogenize the intensity distribution thereof. The diffuser plate 43 can be identical to the diffuser plate 13 described above.

The pickup lens 44 parallelizes the blue light BL diffused by the diffuser plate 43. The pickup lens 44 is formed of a single lens. The pickup lens 44 may instead be formed of a plurality of lenses.

The fourth light source apparatus 114 thus outputs the blue light BL, which is formed of laser light, toward the fourth integrator 64 of the integrator 60A for laser light.

The light source unit 110 thus outputs illumination light WA containing the red light RL, the first green light GL1, the second green light GL2, and the blue light BL toward the integrator 60A for laser light and the integrator 60B for fluorescence, as shown in FIG. 2. In the present embodiment, the red light RL, the first green light GL1, the second green light GL2, and the blue light BL do not overlap with each other.

The red light RL outputted from the light source unit 110 enters the first integrator 61 of the integrator 60A for laser light, as shown in FIG. 3. The first integrator (first integrator for laser light) 61 includes a first multi-lens array 61U including a plurality of first lenslets. The first multi-lens array 61U includes a light-incident-side multi-lens array (first light-incident-side multi-lens array) 61a and a light-exiting-side multi-lens array (first light-exiting-side multi-lens array) 61b. The light-incident-side multi-lens array 61a is formed, for example, of a plurality of lenslets (first lenslets) 61a1 arranged in a plane. The light-incident-side multi-lens array 61a, specifically, the lenslets 61a1 divide the red light RL outputted from the first light source apparatus 111 into a plurality of thin light fluxes and causes each of the thin light fluxes to converge.

The light-exiting-side multi-lens array 61b includes, for example, a plurality of lenslets 61b1 arranged in a plane in correspondence with the lenslets 61a1 of the light-incident-side multi-lens array 61a. In the present embodiment, the light-exiting-side multi-lens array 61b along with the superimposing lens 74, which will be described later, superimposes images of the lenslets 61a1 of the light-incident-side multi-lens array 61a on one another and causes the superimposed images to be incident on the light modulator 200.

Figure 6:
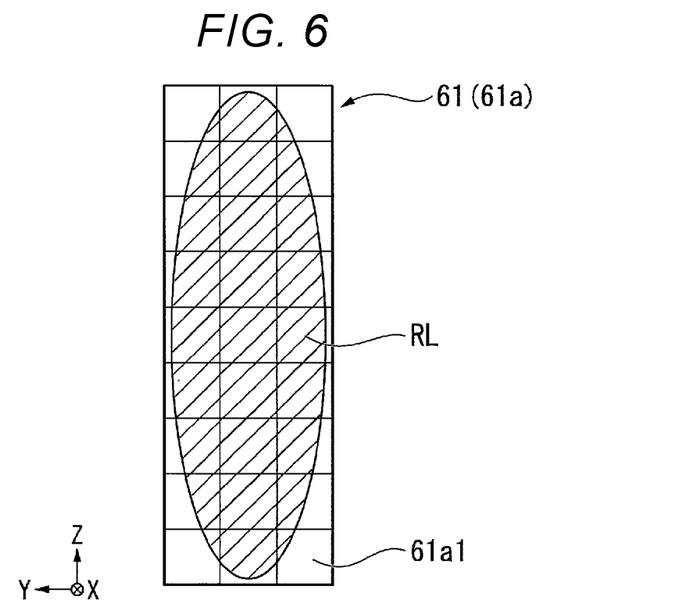
FIG. 6 is a plan view showing the configuration of a key portion of a first integrator.

In the present embodiment, the first integrator 61 is so designed as to along with the superimposing lens 74 efficiently homogenize the illuminance distribution of the red light RL, which is laser light. FIG. 6 is a plan view showing the configuration of a key portion of the first integrator. FIG. 6 shows the planar configuration of the light-incident-side multi-lens array 61a, on which the red light RL is incident, out of the first integrator 61.

The red light RL forms an elliptical illumination area (spot) on the first integrator 61 (light-incident-side multi-lens array 61a), as shown in FIG. 6. That is, the shape of the spot of the red light RL has a lengthwise direction.

The light-incident-side multi-lens array 61a has an oblong outer shape and allows the entire red light RL to be efficiently captured. The light-incident-side multi-lens array 61a has an oblong outer shape having long edges extending along the direction Z parallel to the major axis of the red light RL and short edges extending along the direction Y parallel to the minor axis of the red light RL.

In the light-incident-side multi-lens array 61a, a lens division number in the long-edge direction (direction Z) is desirably greater than the lens division number in the short-edge direction (direction Y). For example, the number of lenses in the long-edge direction (direction Z) is desirably at least twice the number of lenses in the short-edge direction (direction Y). In the present specification, "the lens division number" means the number of lenslets 61a1, which divide the area where the spot of the red light RL is formed into smaller areas.

Specifically, the light-incident-side multi-lens array 61a in the present embodiment is formed, for example, of 9-row lenslets 61a1 in the long-edge direction (direction Z) and 3-column lenslets 61a1 in the short-edge direction (direction Y) or 3×9=27 lenslets 61a1 in total arranged in a plane.

That is, since the light-incident-side multi-lens array 61a, specifically, the 27 lenslets 61a1 divide the red light RL, the lens division number of the light-incident-side multi-lens array 61a is "27". The lens division number of the light-exiting-side multi-lens array 61b is equal to the lens division number of the light-incident-side multi-lens array 61a.

The red light RL having exited out of the first integrator 61 is laser light and therefore does not need to undergo the polarization conversion performed by the polarization conversion unit 70. The red light RL therefore does not travel through the polarization conversion unit 70 but travels through the light blocker 90, which will be described later, and enters the superimposing lens 74.

The first green light GL1 outputted from the light source unit 110 enters the second integrator 62 of the integrator 60B for fluorescence. The second integrator (first integrator for fluorescence) 62 includes a second multi-lens array 62U including a plurality of second lenslets. The second multi-lens array 62U includes a light-incident-side multi-lens array (second light-incident-side multi-lens array) 62a and a light-exiting-side multi-lens array (second light-exiting-side multi-lens array) 62b. The light-incident-side multi-lens array 62a is formed, for example, of a plurality of lenslets (second lenslets) 62a1 arranged in a plane. The light-incident-side multi-lens array 62a, specifically, the lenslets 62a1 divide the first green light GL1 outputted from the second light source apparatus 112 into a plurality of thin light fluxes and causes each of the thin light fluxes to converge.

The light-exiting-side multi-lens array 62b includes, for example, a plurality of lenslets 62b1 arranged in a plane in correspondence with the lenslets 62a1 of the light-incident-side multi-lens array 62a. In the present embodiment, the light-exiting-side multi-lens array 62b along with the superimposing lens 74, which will be described later, superimposes images of the lenslets 62a1 of the light-incident-side multi-lens array 62a on one another and causes the superimposed images to be incident on the light modulator 200.

Figure 7:
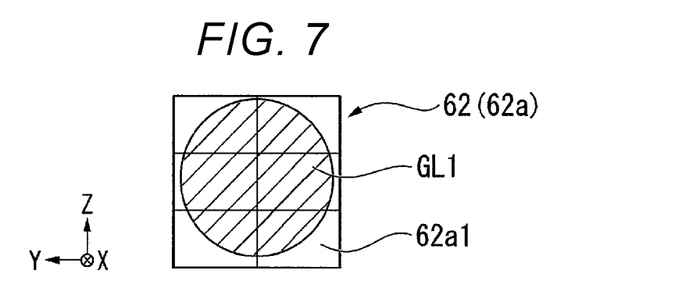
FIG. 7 is a plan view showing the configuration of a key portion of a second integrator.

In the present embodiment, the second integrator 62 is so designed as to along with the superimposing lens 74 efficiently homogenize the illuminance distribution of the first green light GL1, which is fluorescence. FIG. 7 is a plan view showing the configuration of a key portion of the second integrator. FIG. 7 shows the planar configuration of the light-incident-side multi-lens array 62a, on which the first green light GL1 is incident, out of the second integrator 62.

To improve the illuminance distribution of the first green light GL1 on the light modulator 200, it is desirable to increase the lens division number in the second integrator 62. Specifically, it is desirable to set the lens division number in the second integrator 62 in such a way that the illuminance distribution of the first green light GL1 on the light modulator 200 is substantially the same as the illuminance distribution of the red light RL on the light modulator 200.

The first green light GL1 forms a circular illumination area (spot) on the light-incident-side multi-lens array 62a, as shown in FIG. 7. The light-incident-side multi-lens array 62a has a square outer shape and allows the entire first green light GL1 to be efficiently captured. That is, the light-incident-side multi-lens array 62a has a substantially square outer shape.

The first green light GL1 radially emitted from the phosphor layer 23 has a relatively higher illuminance distribution as compared with that of the red light RL, which is laser light. The second integrator 62 therefore allows the illuminance distribution of the first green light GL1 on the light modulator 200 to be substantially the same as the illuminance distribution of the red light RL on the light modulator 200 even in a case where the lens division number in the second integrator 62, which divides the first green light GL1, is smaller than the lens division number in the first integrator 61, which divides the red light RL.

Specifically, the light-incident-side multi-lens array 62a is formed, for example, of 3-row lenslets 62a1 in the direction Z and 2-column lenslets 62a1 in the direction Y or 3×2=6 lenslets 62a1 in total arranged in a plane. The light-incident-side multi-lens array 62a, specifically, the 6 lenslets 62a1 divide the first green light GL1. In the present specification, the number of lenslets 62a1 of the light-incident-side multi-lens array 62a, which divide the area where the spot of the first green light GL1 is formed into smaller areas, is called "the lens division number." That is, the lens division number of the light-incident-side multi-lens array 62a is "6".

As described above, the lens division number in the first integrator 61 corresponding to laser light is greater than the lens division number in the second integrator 62 corresponding to fluorescence in the present embodiment. That is, the lens division number of the light-incident-side multi-lens array 61a is greater than the lens division number of the light-incident-side multi-lens array 62a.

The first green light GL1 having exited out of the second integrator 62 is incident on the first polarization converter 71, as shown in FIG. 3. The first polarization converter 71 converts the non-polarized first green light GL1 into linearly polarized light.

The first polarization converter 71 is so designed as to correspond to the first green light GL1 that are a plurality of light fluxes divided by the second integrator 62. That is, the first polarization converter 71 is formed of polarization separation films and retardation films (half-wave plates) arranged in an array at intervals according to the lens division number in the second integrator 62.

It is typically difficult to arrange the components of a polarization converter at small intervals as compared with a multi-lens array that forms an integrator. For example, it is difficult to manufacture a polarization converter having components thereof arranged at intervals corresponding to the lens division number of "27" of the multi-lens arrays 61a and 61b, which form the first integrator 61.

If the lens division number in the second integrator 62 is so set as to be equal to the lens division number of "27" in the first integrator 61, it is difficult for the first polarization converter 71 to convert the polarization direction of the first green light GL1 into a predetermined direction. The polarization direction of the first green light GL1 cannot therefore correspond to the transmission axis of the light-incident-side polarizer 201a disposed on the light incident side of the light modulator 200. Part of the first green light GL1 cannot therefore pass through the light-incident-side polarizer 201a, undesirably resulting in a problem of a decrease in the light use efficiency.

In contrast, in the present embodiment, in which the lens division number of "6" in the second integrator 62 is smaller than the lens division number of "27" in the first integrator 61, the components of the first polarization converter 71 do not need to be arranged at small intervals. The first polarization converter 71 is therefore so manufactured that the components thereof are arranged at intervals that allow satisfactory conversion of the polarization state of the first green light GL1 having exited out of the second integrator 62.

The first polarization converter 71 can therefore convert the first green light GL1 having traveled via the second integrator 62 into light polarized in parallel to the axis Z. The polarization direction of the first green light GL1 to be incident on the light modulator 200 can therefore correspond to the transmission axis of the light-incident-side polarizer 201a disposed on the light incident side of the light modulator 200. The light-incident-side polarizer 201a therefore does not block the first green light GL1 to be incident on the light modulator 200, whereby the light use efficiency can be improved.

The second green light GL2 outputted from the light source unit 110 enters the third integrator 63 of the integrator 60B for fluorescence. The third integrator (integrator for fluorescence) 63 has the same configuration as that of the second integrator 62. That is, the third integrator 63 is formed of a second multi-lens array 62U including a light-incident-side multi-lens array 62a and a light-exiting-side multi-lens array 62b.

The second green light GL2 having exited out of the third integrator 63 is incident on the second polarization converter 72. The second polarization converter 72 has the same configuration as that of the first polarization converter 71. The second polarization converter 72 can therefore convert the second green light GL2 having traveled via the third integrator 63 into light polarized in parallel to the axis Z. The polarization direction of the second green light GL2 to be incident on the light modulator 200 can therefore correspond to the transmission axis of the light-incident-side polarizer 201a disposed on the light incident side of the light modulator 200. The light-incident-side polarizer 201a therefore does not block the second green light GL2 to be incident on the light modulator 200, whereby the light use efficiency can be improved.

The blue light BL outputted from the light source unit 110 enters the fourth integrator 64 of the integrator 60A for laser light. It is assumed in the present embodiment that the illuminance distribution of the blue light BL is substantially the same as the illuminance distribution of the red light RL. The fourth integrator (second integrator for laser light) 64 in the present embodiment has the same configuration as that of the first integrator 61, which homogenizes the illuminance distribution of the red light RL. That is, the fourth integrator 64 is formed of the first multi-lens array 61U including the light-incident-side multi-lens array 61a and the light-exiting-side multi-lens array 61b. The lens division number in the fourth integrator 64 is "27".

The blue light BL having exited out of the fourth integrator 64 is laser light and therefore does not need to undergo the polarization conversion performed by the polarization conversion unit 70. The blue light BL therefore does not travel through the polarization conversion unit 70 but travels through the light blocker 90 and enters the superimposing lens 74.

In the present embodiment, the light blocker 90 is provided between the light exiting side of the polarization conversion unit 70 and the superimposing lens 74. The light blocker 90 is formed, for example, of a light blocking member on which carbon black or any other material has been printed or a light blocking member having undergone a black anodized aluminum process.

The light blocker 90 blocks part of the light from the light source unit 110 having traveled via the integrator 60A for laser light, the integrator 60B for fluorescence, and the polarization conversion unit 70 to shape the light. The light blocker 90 is not necessarily disposed in the position described above and may instead be disposed on the light exiting side of the integrator 60A for laser light and the integrator 60B for fluorescence.

Figure 8:
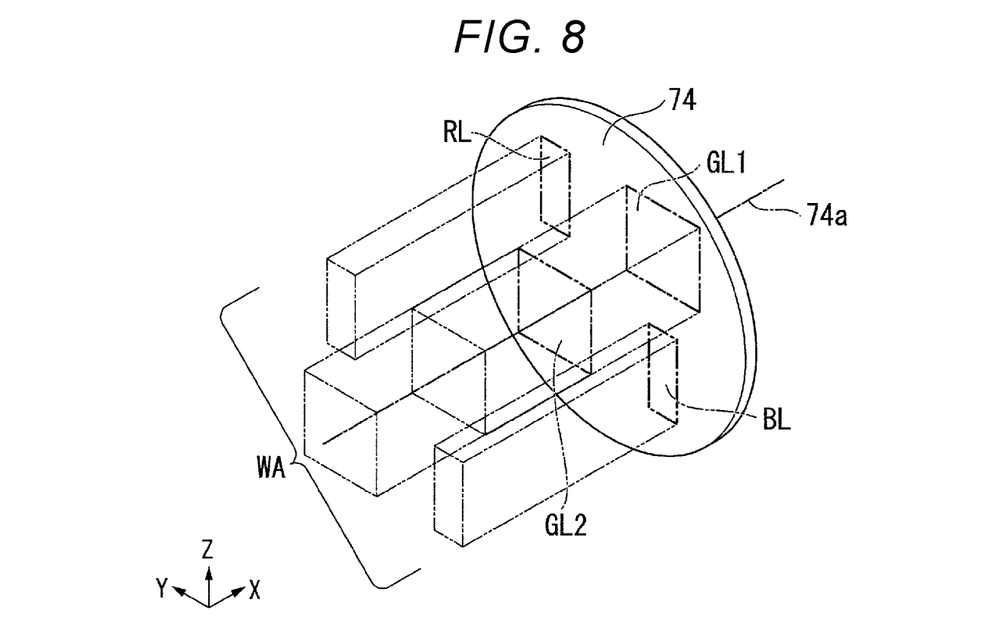
FIG. 8 conceptually shows light incident positions on a superimposing lens.

FIG. 8 conceptually shows the light incident positions on the superimposing lens. In FIG. 8, the red light RL, the first green light GL1, the second green light GL2, and the blue light BL shaped by the light blocker 90 are diagrammatically shown.

The illumination light WA having traveled through the integrator 60A for laser light, integrator 60B for fluorescence, the polarization conversion unit 70 and the light blocker 90 enter the superimposing lens 74 with the non-overlap state of the red light RL, the first green light GL1, the second green light GL2, and the blue light BL still maintained.

The red light RL, the blue light BL, the first green light GL1, and the second green light GL2, are therefore incident on different areas of the superimposing lens 74, as shown in FIG. 8. The chief rays of the red light RL, the blue light BL, the first green light GL1, and the second green light GL2 are separate from a lens optical axis 74a of the superimposing lens 74 by the same distance. In a case where the red light RL, the blue light BL, the first green light GL1, and the second green light GL2 are not particularly distinguished from one another, they are hereinafter collectively referred to as color light fluxes RL, BL, GL1, and GL2 in some cases.

In the present embodiment, the superimposing lens 74 causes the directions in which the color light fluxes RL, BL, GL1, and GL2 are incident on the light modulator 200 to differ from one another in accordance with the positions where the color light fluxes RL, BL, GL1, and GL2 are incident on the superimposing lens 74. That is, the superimposing lens 74 allows the color light fluxes RL, BL, GL1, and GL2 to be incident on each pixel of the light modulator 200 in four directions.

Figure 9:
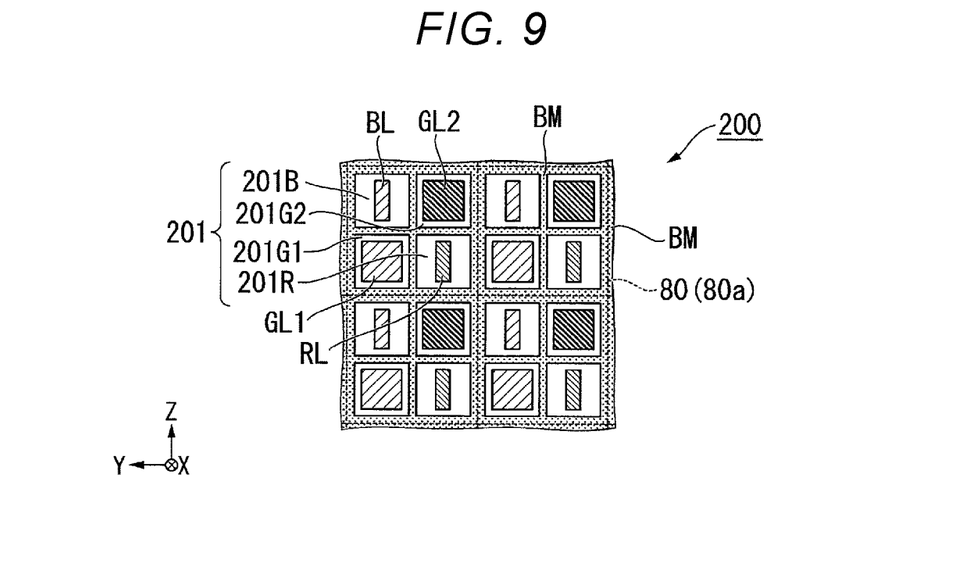
FIG. 9 is a plan view showing the structure of pixels of a light modulator.

The structure of the pixels of the light modulator 200 will now be described.

FIG. 9 is a plan view showing the structure of the pixels of the light modulator. The light modulator 200 includes a plurality of pixels 201, as shown in FIG. 9. The pixels 201 are each formed of a first sub-pixel 201R, a second sub-pixel 201B, a third sub-pixel 201G1, and a fourth sub-pixel 201G2. The first sub-pixels 201R, the second sub-pixels 201B, the third sub-pixels 201G1, and the fourth sub-pixels 201G2 are hereinafter abbreviated simply to sub-pixels 201R, 201B, 201G1, and 201G2 in some cases.

In the present embodiment, the sub-pixels 201R, 201B, 201G1, and 201G2 each have a square shape. In the light modulator 200, the plurality of pixels 201 are arranged in a matrix along the directions Y and Z. The pixels 201 are each configured as follows: The first sub-pixel 201R and the fourth sub-pixel 201G2 are disposed in this order toward the positive side of the direction Z; the third sub-pixel 201G1 is disposed on the positive side of the first sub-pixel 201R in the direction Y; and the second sub-pixel 201B is disposed on the positive side of the fourth sub-pixel 201G2 in the direction Y. The sub-pixels 201R, 201B, 201G1, and 201G2 are separated from each other by a black matrix BM in the form of a lattice.

Figure 10:
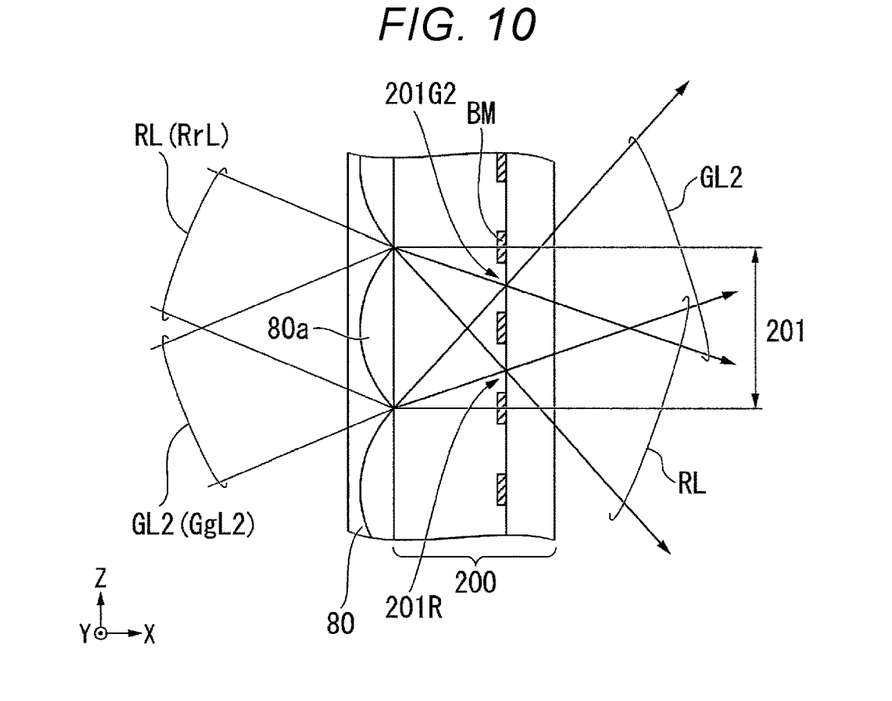
FIG. 10 is a cross-sectional view showing a key portion of the structure of the pixels of the light modulator.
Figure 11:
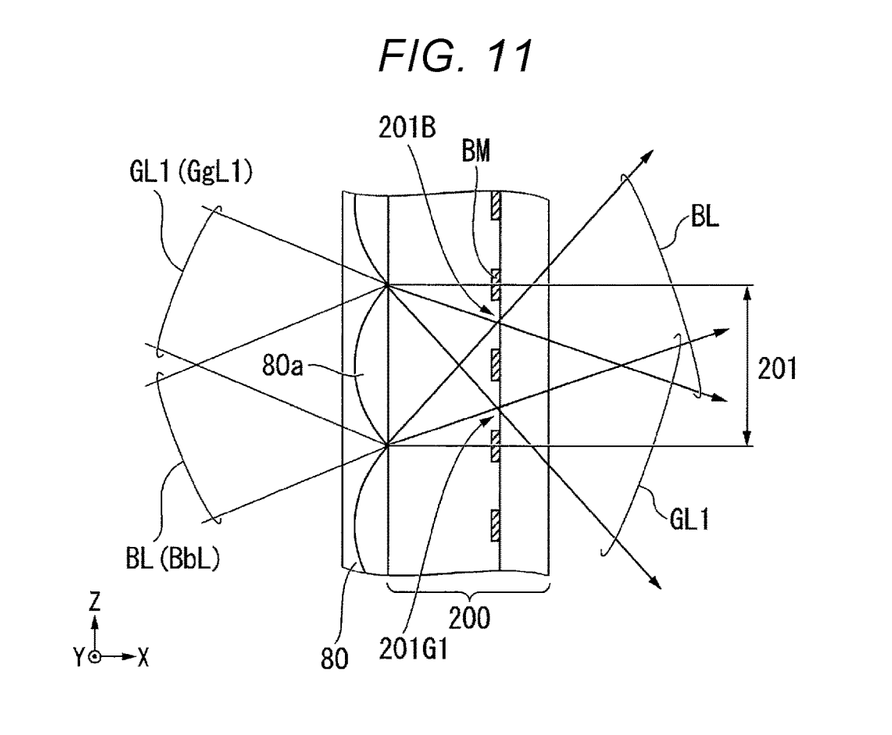
FIG. 11 is a cross-sectional view showing another key portion of the structure of the pixels of the light modulator.

FIGS. 10 and 11 are cross-sectional views showing a key portion of the structure of the pixels of the light modulator.

A microlens array 80 is integrally provided on the light-incident-side surface of the light modulator 200 as part thereof in the present embodiment, as shown in FIGS. 10 and 11. The microlens array 80 may instead be a component different from the light modulator 200. FIG. 10 shows a cross-sectional configuration of the first sub-pixels 201R and the fourth sub-pixels 201G2, and FIG. 11 shows a cross-sectional configuration of the second sub-pixels 201B and the third sub-pixels 201G1.

The microlens array 80 includes a plurality of microlenses 80a and forms a plurality of very thin light fluxes from the light incident on the microlens array 80.

Specifically, the red light RL incident on the microlens array 80 is divided by the plurality of microlenses 80a into a plurality of very thin light fluxes RrL, as shown in FIG. 10. The second green light GL2 incident on the microlens array 80 is divided by the plurality of microlenses 80a into a plurality of very thin light fluxes GgL2.

The blue light BL incident on the microlens array 80 is divided by the plurality of microlenses 80a into a plurality of very thin light fluxes BbL, as shown in FIG. 11. The first green light GL1 incident on the microlens array 80 is divided by the plurality of microlenses 80a into a plurality of very thin light fluxes GgL1.

The microlenses 80a are disposed in correspondence with the pixels 201 of the light modulator 200 in the one-to-one relationship. The projector 1 according to the present embodiment, in which the color light fluxes RL, BL, GL1, and GL2 are incident on the superimposing lens 74 in different positions, as shown in FIG. 8, allows the color light fluxes RL, BL, GL1, and GL2 to be incident on the microlens array 80 in four directions.

The red light RL incident on the microlens array 80 obliquely from above is divided into the very thin light fluxes RrL, which are then incident on the first sub-pixels 201R. That is, the red light RL out of the illumination light WA incident on the light modulator 200 is incident on the first sub-pixels 201R.

The blue light BL incident on the microlens array 80 obliquely from below is divided into the very thin light fluxes BbL, which are then incident on the second sub-pixels 201B. That is, the blue light BL out of the illumination light WA incident on the light modulator 200 is incident on the second sub-pixels 201B.

The first green light GL1 incident on the microlens array 80 obliquely from above is divided into the very thin light fluxes GgL1, which are then incident on the third sub-pixels 201G1. That is, the first green light GL1 out of the illumination light WA incident on the light modulator 200 is incident on the third sub-pixels 201G1.

The second green light GL2 incident on the microlens array 80 obliquely from below is divided into the very thin light fluxes GgL2, which are then incident on the fourth sub-pixels 201G2. That is, the second green light GL2 out of the illumination light WA incident on the light modulator 200 is incident on the fourth sub-pixels 201G2.

The projector 1 according to the present embodiment causes no difference in optical path length among the color light fluxes and in turn no difference in size of the illuminated area among the colors, unlike in the case where a plurality of dichroic mirrors are used to adjust the directions in which the color light fluxes are incident on the sub-pixels of the light modulator 200, as in the related art. The projector 1 according to the present embodiment therefore causes no difference in optical path length among the separated color light fluxes RL, BL, GL1, and GL2 achieved by the configuration in which the light fluxes are incident on the superimposing lens 74 in different positions and therefore causes no difference in size among the areas illuminated with the color light fluxes RL, BL, GL1, and GL2. The color light fluxes RL, BL, GL1, and GL2 are therefore efficiently incident on the light modulator 200, whereby a decrease in the light use efficiency of the illuminator 100 can be avoided.

In the projector 1 according to the present embodiment, the integrators 61 and 64 corresponding to the red light RL and the blue light BL, which are each laser light, each have a large lens division number, and the integrators 62 and 63 corresponding to the first green light GL1 and the second green light GL2, which are each fluorescence, each have a small lens division number. The configuration described above does not sufficiently improve the performance of superposition of the red light RL and the blue light BL on each other, whereby illuminance unevenness on the light modulator 200 can be reduced. Further, the configuration described above does not improve more than necessary the performance of superposition of the first green light GL1 and the second green light GL2 each other on the polarization converters disposed on the downstream of the integrators 62 and 63, which each have a small lens division number, and the first green light GL1 and the second green light GL2 are converted by the polarization converters 71 and 72 into predetermined linearly polarized light fluxes, which can then be efficiently incident on the light modulator 200.

To cause the light modulator 200 to produce satisfactory image light, color light fluxes corresponding to the sub-pixels 201R, 201B, 201G1, and 201G2 need to be appropriately incident on the respective sub-pixels. To cause the color light fluxes corresponding to the sub-pixels 201R, 201B, 201G1, and 201G2 to be appropriately incident on the respective sub-pixels, the color light fluxes RL, BL, GL1, and GL2 need to be sufficiently parallelized before the light fluxes enter the superimposing lens 74. It is, however, difficult to sufficiently parallelize the color light fluxes RL, BL, GL1, and GL2 due to aberrations produced by a lens, and the color light fluxes RL, BL, GL1, and GL2 could undesirably each contain a convergent or divergent component. The color light fluxes RL, BL, GL1, and GL2 could instead contain a diffracted component in some cases.

In the projector 1 according to the present embodiment, the light blocker 90 blocks part of the light from the light source unit 110 having traveled via the integrator 60A for laser light, the integrator 60B for fluorescence, and the polarization conversion unit 70.

A case where no light blocker 90 is provided will now be described as Comparative Example. In the case where no light blocker 90 is provided, an image of the very thin light flux RrL, for example, in one pixel 201 extends over adjacent sub-pixels. The very thin light flux RrL is therefore incident not only on the first sub-pixel 201R but on the other sub-pixels 201B, 201G1, and 201G2 adjacent to the first sub-pixel 201R. The image light therefore bleeds out, resulting in a decrease in the quality of the image light projected on the screen SCR.

In contrast, the projector 1 according to the present embodiment, in which the light blocker 90 blocks part of the light from the light source unit 110 having traveled via the integrator 60A for laser light, the integrator 60B for fluorescence, and the polarization conversion unit 70, can prevent the image light from bleeding, unlike in Comparative Example.

Figure 12:
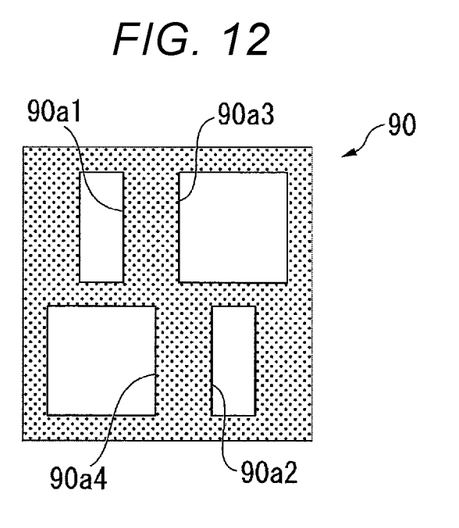
FIG. 12 is a plan view showing a schematic configuration of a light blocker.

FIG. 12 is a plan view showing a schematic configuration of the light blocker 90. The light blocker 90 includes a first opening 90a1, a second opening 90a2, a third opening 90a3, and a fourth opening 90a4.

The first opening 90a1 corresponds to the first sub-pixels 201R. The second opening 90a2 corresponds to the second sub-pixels 201B. The third opening 90a3 corresponds to the third sub-pixels 201G1. The fourth opening 90a4 corresponds to the fourth sub-pixels 201G2. The openings 90a1, 90a2, 90a3, and 90a4 are optically conjugate with the sub-pixels 201R, 201B, 201G1, and 201G2, respectively.

That is, the red light RL out of the illumination light WA is incident on the first opening 90a1 of the light blocker 90. As a result, for example, even in the case where the red light RL is not sufficiently parallelized due to aberrations and therefore contains a convergent or divergent component or a diffracted component, the convergent or divergent component or the diffracted component cannot pass through the first opening 90a1 but blocked by the light blocker 90. Since the first opening 90a1 has an oblong shape, the red light RL forms an oblong spot on the superimposing lens 74. The red light RL having passed through the first opening 90a1 forms an illumination spot having a substantially oblong cross-sectional shape on each of the first sub-pixels 201R, as shown in FIG. 9.

The blue light BL out of the illumination light WA is incident on the second opening 90a2. As a result, for example, even in the case where the blue light BL is not sufficiently parallelized due to aberrations and therefore contains a convergent or divergent component or a diffracted component, the convergent or divergent component or the diffracted component cannot pass through the second opening 90a2 but blocked by the light blocker 90. Since the second opening 90a2 has an oblong shape, the blue light BL forms an oblong spot on the superimposing lens 74. The blue light BL having passed through the second opening 90a2 forms an illumination spot having a substantially oblong cross-sectional shape on each of the second sub-pixels 201B, as shown in FIG. 9.

The first green light GL1 out of the illumination light WA is incident on the third opening 90a3. As a result, for example, even in the case where the first green light GL1 is not sufficiently parallelized due to aberrations and therefore contains a convergent or divergent component or a diffracted component, the convergent or divergent component or the diffracted component cannot pass through the third opening 90a3 but blocked by the light blocker 90. Since the third opening 90a3 has a square shape, the first green light GL1 forms a square spot on the superimposing lens 74. The first green light GL1 having passed through the third opening 90a3 forms an illumination spot having a substantially square cross-sectional shape on each of the third sub-pixels 201G1, as shown in FIG. 9.

The second green light GL2 out of the illumination light WA is incident on the fourth opening 90a4. As a result, for example, even in the case where the second green light GL2 is not sufficiently parallelized due to aberrations and therefore contains a convergent or divergent component or a diffracted component, the convergent or divergent component or the diffracted component cannot pass through the fourth opening 90a4 but blocked by the light blocker 90. Since the fourth opening 90a4 has a square shape, the second green light GL2 forms a square spot on the superimposing lens 74. The second green light GL2 having passed through the fourth opening 90a4 forms an illumination spot having a substantially square cross-sectional shape on each of the fourth sub-pixels 201G2, as shown in FIG. 9.

As described above, in the projector 1 according to the present embodiment, the light blocker 90 can shape the color light fluxes RL, BL, GL1, and GL2 contained in the illumination light WA in such a way that any of the color light fluxes is not incident on a pixel adjacent to the intended one of the sub-pixels 201R, 201B, 201G1, and 201G2, that is, no color mixing occurs.

As described above, the projector 1 according to the present embodiment allows the very thin light fluxes RrL, BbL, GgL1, and GgL2 to be satisfactorily incident on the corresponding sub-pixels 201R, 201B, 201G1, and 201G2. The very thin light fluxes RrL, BbL, GgL1, and GgL2 therefore do not each extend over adjacent sub-pixels. That is, for example, the very thin light flux RrL is incident only on the first sub-pixels 201R but is not incident on the black matrix BM, which separates the first sub-pixels 201R from each other.

Color mixing that occurs when the same color light is incident on sub-pixels adjacent to each other out of the sub-pixels 201R, 201B, 201G1, and 201G2 can therefore be avoided in conjunction with improvement in the efficiency at which the light from the illuminator 100 is used. The projector can therefore project a high-quality image with light bleeding reduced on the screen SCR.

Further, the projector 1 according to the present embodiment, in which the light blocker 90 can reduce the amount of light incident on the black matrix BM around each of the pixels 201, allows suppression of heat generation in the black matrix BM and hence allows suppression of degradation of the liquid crystal material due to heat. The projector 1 according to the present embodiment can therefore display a high-quality image over a long period because the life of the liquid crystal material is prolonged.

The present disclosure is not limited to the contents of the embodiment described above and can be changed as appropriate to the extent that the change does not depart from the substance of the present disclosure.

The projector 1 according to the above embodiment has been described with reference to the case where the first light source apparatus 111 and the fourth light source apparatus 114 are each provided as a light source apparatus that outputs laser light, and only one of the first light source apparatus 111 and the fourth light source apparatus 114 may instead be provided. Further, the projector 1 has been described with reference to the case where the second light source apparatus 112 and the third light source apparatus 113 are each provided as a light source apparatus that outputs fluorescence, and only one of the second light source apparatus 112 and the third light source apparatus 113 may instead be provided. That is, the light source unit 110 may be formed of one of the first light source apparatus 111 and the fourth light source apparatus 114 and one of the second light source apparatus 112 and the third light source apparatus 113. In this case, the integrator 60A for laser light and the integrator 60B for fluorescence are each formed of one integrator, the polarization conversion unit 70 is formed of one polarization converter, and the pixels 201 of the light modulator 200 are each formed of two sub-pixels.

The arrangement of the sub-pixels 201R, 201B, 201G1, and 201G2, which form each of the pixels 201 of the light modulator 200 in the embodiment described above, does not necessarily have the form shown in FIG. 9. For example, in each of the pixels 201, the third sub-pixel 201G1 and the fourth sub-pixel 201G2 may be vertically disposed side by side.

What is claimed is:
1. A projector comprising:
a first laser light source apparatus that outputs first laser light;
a first fluorescence light source apparatus that includes a phosphor and outputs first fluorescence;
a first integrator that the laser light enters;
a second integrator that the fluorescence enters;
a superimposing lens which is provided on a downstream of the first integrator and the second integrator and which the first laser light and the first fluorescence enter;
a light modulator on which the first laser light and the first fluorescence having exited out of the superimposing lens are incident and which includes a plurality of pixels each formed of a plurality of sub-pixels;
a microlens array including a plurality of microlenses provided in correspondence with the plurality of pixels; and
a projection optical apparatus that projects light outputted from the light modulator, wherein
the first integrator includes a first multi-lens array including a plurality of first lenslets,
the second integrator includes a second multi-lens array including a plurality of second lenslets, and
a lens division number of the first multi-lens array is greater than a lens division number of the second multi-lens array.

2. The projector according to claim 1,
wherein the first multi-lens array includes a first light-incident-side multi-lens array and a first light-exiting-side multi-lens array so disposed as to correspond to the first light-incident-side multi-lens array, and
the second multi-lens array includes a second light-incident-side multi-lens array and a second light-exiting-side multi-lens array so disposed as to correspond to the second light-incident-side multi-lens array.

3. The projector according to claim 2,
wherein a shape of a spot of the first laser light formed on the first light-incident-side multi-lens array has a lengthwise direction, and
a lens division number of the first light-incident-side multi-lens array in the lengthwise direction is greater than the lens division number of the first light-incident-side multi-lens array in a widthwise direction.

4. The projector according to claim 1,
further comprising a polarization converter provided between a light exiting side of the second integrator and the superimposing lens.

5. The projector according to claim 1,
further comprising a second laser light source apparatus that outputs second laser light,
a second fluorescence light source apparatus that outputs second fluorescence,
a third integrator that the second fluorescence enters, and
a fourth integrator that the second laser light enters.

6. The projector according to claim 5,
wherein the first laser light, the second laser light, the first fluorescence, and the second fluorescence are incident on the superimposing lens in different positions.

7. The projector according to claim 6,
wherein the plurality of sub-pixels include a first sub-pixel, a second sub-pixel, a third sub-pixel, and a fourth sub-pixel,
the first laser light is incident on the first sub-pixels,
the second laser light is incident on the second sub-pixels,
the first fluorescence is incident on the third sub-pixels, and the second fluorescence is incident on the fourth subpixels.

8. The projector according to claim 5,
wherein the first laser light is red light,
the second laser light is blue light,
the first fluorescence is first green light, and
the second fluorescence is second green light.

\* \* \* \* \*